(12) United States Patent
Lee et al.

(10) Patent No.: US 7,449,112 B2
(45) Date of Patent: Nov. 11, 2008

(54) CROSSLINKED POLYVINYL ALCOHOL-BASED POLYMER MEMBRANE AND A PROCESS OF ITS PREPARATION

(75) Inventors: Soo-Bok Lee, Daejeon (KR); Jeong Hoon Kim, Daejeon (KR); In Jun Park, Daejeon (KR); Dong-Kwon Kim, Daejeon (KR); Jong-Wook Ha, Daejeon (KR); Bong-Jun Chang, Daejeon (KR); Kwang-Won Lee, Daejeon (KR); Kwang-Han Kim, Daejeon (KR); Sang-yun Lee, Daejeon (KR); Sang-Man Ahn, Daejeon (KR); Seung-Hak Choi, Kangwondo (KR)

(73) Assignee: Korea Research Institute of Chemical Technology (KR)

( * ) Notice: Subject to any disclaimer, the term of this patent is extended or adjusted under 35 U.S.C. 154(b) by 408 days.

(21) Appl. No.: 11/091,896

(22) Filed: Mar. 29, 2005

(65) Prior Publication Data

US 2005/0218069 A1 Oct. 6, 2005

(30) Foreign Application Priority Data

Mar. 30, 2004 (KR) .................... 10-2004-0021736

(51) Int. Cl.
*B01D 39/14* (2006.01)
*B01D 39/00* (2006.01)
*B01D 29/00* (2006.01)
*B01D 33/21* (2006.01)

(52) U.S. Cl. .................... 210/500.42; 210/500.34; 210/500.23; 210/490; 210/500.27; 264/41; 428/310.5

(58) Field of Classification Search ............ 210/500.27, 210/490, 500.42, 640, 500.21, 500.23, 638, 210/500.34; 95/51–52; 264/41; 424/1.65; 428/500, 310.5

See application file for complete search history.

(56) References Cited

U.S. PATENT DOCUMENTS

| | | | | |
|---|---|---|---|---|
| 4,808,313 A | * | 2/1989 | Michizuki et al. | 210/500.28 |
| 4,911,844 A | * | 3/1990 | Linder et al. | 210/638 |
| 4,985,147 A | * | 1/1991 | Mochizuki et al. | 210/500.27 |
| 6,264,914 B1 | * | 7/2001 | Klaveness et al. | 424/1.65 |
| 6,523,699 B1 | * | 2/2003 | Akita et al. | 210/490 |
| 6,743,521 B2 | * | 6/2004 | Hubbell et al. | 428/500 |
| 6,814,865 B1 | * | 11/2004 | Aminabhavi et al. | 210/500.21 |
| 6,830,671 B2 | * | 12/2004 | Aritomi et al. | 204/539 |
| 7,153,945 B2 | * | 12/2006 | Ogino et al. | 530/412 |
| 7,247,370 B2 | * | 7/2007 | Childs et al. | 428/310.5 |

OTHER PUBLICATIONS

Nagura et al., "Structure of Poly(Vinyl Alcohol) Hydrogel Prepared by Repeated Freezing and Melting", Polymer, vol. 30, pp. 762-765, (1989).

Nijenhuis, "Thermoreversible Networks (Viscoelastic Properties and Structure of Gels)", Advances in Polymer Science, vol. 130, No. 1, pp. 1-235, (1997).

Gimenez et al., "Modification of Poly(Vinyl Alcohol) With Acid Chlorides and Crosslinking With Difunctional Hardeners", Journal of Polymer Science: Part A: Polymer Chemistry, vol. 34, pp. 925-934, (1996).

Gimenez et al., "Crosslinking of Poly(Vinyl Alcohol) Using Dianhydrides as Hardeners", Journal of Applied Polymer Science, vol. 59, pp. 425-431, (1996).

* cited by examiner

*Primary Examiner*—Ana M Fortuna
(74) *Attorney, Agent, or Firm*—Finnegan, Henderson, Farabow, Garrett & Dunner LLP

(57) ABSTRACT

A novel polyvinyl alcohol-based polymer membrane is disclosed. The novel polyvinyl alcohol-based polymer membrane of the present invention comprises two different compounds which are crosslinked by irradiating light such as UV or electronic beams or heat treatment to form a covalent bond between double bonds thereby providing improved properties such as chemical resistance and durability. This invention also relates to a process its preparation.

9 Claims, No Drawings

CROSSLINKED POLYVINYL ALCOHOL-BASED POLYMER MEMBRANE AND A PROCESS OF ITS PREPARATION

CROSS REFERENCE TO RELATED APPLICATIONS

This application claims priority of Korean Application No. 10-2004-021736, filed Mar. 30, 2004, the disclosure of which is incorporated herein by reference.

TECHNICAL FIELD OF THE INVENTION

This invention relates to a novel polyvinyl alcohol-based polymer membrane and a process of its preparation. More specifically, this invention relates to a novel polyvinyl alcohol-based polymer membrane wherein two different compounds are crosslinked by light irradiation such as UV or electronic beams or heat treatment to form a covalent bond between the double bonds thereby providing improved properties such as chemical resistance and durability. This invention also relates to a process its preparation.

BACKGROUND OF THE INVENTION

Polyvinyl alcohols can readily form thin films having relatively high hydrophilicity and chemical resistance. Therefore, they have been widely used as various kinds of membranes such as reverse osmosis membrane, pervaporation membrane, carbon dioxide separation membrane, dehumidifying membrane, ultrafiltration membrane, precision filtration membrane, separation membrane for membrane reactor carrier for wastewater treatment, transparent hydrophilic surface coating material, blood filtration membrane not contaminated with proteins and the like. In these cases, the films are often crosslinked to increase mechanical strength and durability.

Polyvinyl alcohols can be crosslinked physically by freezing-thawing (Polymer, 1989, 30, 762], or chemically by dialdehyde (Advances in Polymer Science, 1997, 130, 1] diisocyanate (Journal of Polymer Science Part A, 1996, 925) or diacid and its substituents (Journal of Applied Polymer Science, 59, 425). The crosslinked polymers have more like a netlike structure as compared to linear polymers and are thus not easily dissolved and have been used in preparing separation membranes or biological materials with improved mechanical strength.

However, these polymers or the membranes prepared by using the polymers have a disadvantage that they are decomposed during the long-term use because they generally contain acetal, ester or urethane bonding groups which can be easily influenced by acid or water.

SUMMARY OF THE INVENTION

After extensive researches to resolve the disadvantages of the typical polyvinyl alcohol-based polymers, the inventors of the present invention found that when crosslinkable polymers obtained by etherification of two different compounds, wherein the first compound containing a halogen or a tosyl group along with a double bond, and the second compound containing a halogen or a tosyl group along with an electrolyte-conferring group, with a hydroxyl group of polyvinyl alcohol are irradiated by light or treated with heat, there occurs a covalent bond between the double bonds thereby improving chemical resistance and durability of the polymers. Accordingly, the objective of this invention is to provide a novel polyvinyl alcohol-based polymer membrane with improved mechanical strength such as chemical resistance and durability. Further, another objective of this invention is to provide a process of its preparation.

DETAILED DESCRIPTION OF PREFERRED EMBODIMENTS

In an embodiment of the present invention, there is provided a polymer membrane prepared by light irradiation or heat treatment of polymers of the following formula 1.

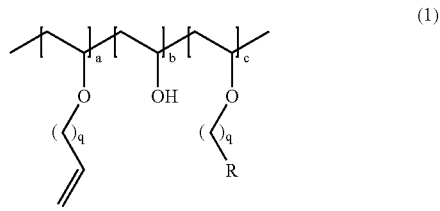

(1)

In the above formula 1, q is an integer of 0 to 3; and R is a functional group having an electrolytic property selected from the group consisting of carboxylic acid, sulfonic acid, and ethylene oxide, and is in the range of $100 \leq a+b+c \leq 100,000$.

In another embodiment of the present invention, there is provided a method of preparing the polymer membrane, as shown in the following reaction scheme 1, which comprises:

(a) reacting
  (i) a polyvinyl alcohol-based polymer of the following formula 2,
  (ii) a compound of the following formula 3 containing both a functional group such as a halogen group or a tosyl group, and
  (iii) a double bond at the same time, and a compound of the following formula 4 containing both a functional group such as a halogen group or a tosyl group and an electrolyte-conferring group, thereby preparing a crosslinkable polymer of the above formula 1; and
(b) coating the crosslinkable polymer of the formula 1 on a base plate and crosslinking.

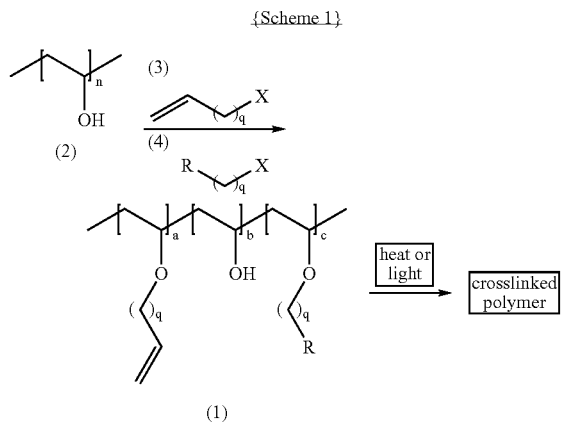

{Scheme 1} wherein q is an integer of 0 to 3;
R is a functional group having an electrolytic property selected from the group consisting of carboxylic acid, sulfonic acid, and ethylene oxide, and is in the range of $100 \leq a+b+c \leq 100{,}000$ and $100 \leq n \leq 100{,}000$; and X is a leaving group selected from the group consisting of a halogen atom, toluene sulfonate and benzylhalide.

The present invention is described in greater details hereunder.

In an embodiment of the present invention, there is provided a crosslinkable polymer of the above formula 1, which is obtained by simultaneous etherification of both a compound of the above formula 3 containing a halogen group or a tosyl group along with a double bond, and a compound of the above formula 3 containing a halogen group or a tosyl group along with an electrolyte-conferring functional group to a hydroxy group of a polyvinyl alcohol-based polymer of the above formula 2. When the above crosslinkable polymer is coated as thin film on a certain surface after mixing with a light initiator or a heat initiator in a predetermined ratio, and then placed under irradiation of UV or electronic beams or heat treatment, there occurs an addition reaction between double bonds thereby forming a crosslinked polyvinyl alcohol-based polymer of the above formula 1 having separation membrane, polymer electrolyte membrane, hydrophilic transparent surface function material, blood filtration membrane or biosurface which do not permit absorption of proteins.

The polyvinyl alcohol-based polymers that can be used in the present invention are the known polymers used in manufacturing crosslinking membranes, preferably at least one selected from the group consisting of polyvinyl alcohol, polyvinylacetate-vinylalcohol copolymer, polyethylene-vinylalcohol copolymer, polyvinylalcohol-(metha)acryl copolymer, polyvinylalcohol-vinylchloride copolymer and polyvinylalcohol-styrene copolymer. The above polymers are capable of selective separation of water due to their high affinity for water and thus are suitable for use as separation membrane, polymer electrolyte membrane, hydrophilic transparent surface function material, blood filtration membrane or biosurface which do not permit absorption of proteins.

Further, the introduction of the double bond of the crosslinkable polymer of the primary component and the electrolyte-conferring functional group of the secondary component to the above polyvinyl alcohol-based polymer by etherification is performed by so-called Williamson ether synthesis. In the above synthesis, a compound containing a halogen group or a tosyl group along with a double bond is used as the primary component while a compound containing a halogen group or a tosyl group along with an electrolyte-conferring functional group is used as the secondary component.

Examples of the above crosslinkable polymer with a double bond of the primary compound are: $CH_2=CHCH_2Cl$, $CH_2=CHCH_2Br$, $CH_2=CHCH_2I$, $CH_2=CHCH_2OC_6H_4CH_3$, $CH_2=CH(CH_2)_2Cl$, $CH_2=CH(CH_2)_2Br$, $CH_2=CH(CH_2)_2I$, $CH_2=CH(CH_2)_2OC_6H_4CH_3$, $CH_3CH=CHCH_2Cl$, $CH_3CH=CHCH_2Br$, $CH_3CH=CHCH_2I$, $CH_3CH=CHCH_2OC_6H_4CH_3$, $CH_2=CHCH(Cl)CH_3$, $CH_2=CHCH(Br)CH_3$, $CH_2=CHCH(I)CH_3$, $CH_2=CHCH(OC_6H_4CH_3)CH_3$, $CH_2=CH(CH_2)_3Cl$, $CH_2=CH(CH_2)_3Br$, $CH_2=CH(CH_2)_3I$, $CH_2=CH(CH_2)_3OC_6H_4CH_3$, $(CH_3)_2C=CHCH_2Cl$, $(CH_3)_2C=CHCH_2Br$, $(CH_3)_2C=CHCH_2I$, $(CH_3)_2C=CHCH_2OC_6H_4CH_3$, $C_6H_5CH=CHCH_2Cl$, $C_6H_5CH=CHCH_2Br$, $C_6H_5CH=CHCH_2I$, $C_6H_5CH=CHCH_2OC_6H_4CH_3$, $CH_2=CHC_6H_4CH_2Cl$, $CH_2=CHC_6H_4CH_2Br$, $CH_2=CHC_6H_4CH_2$ I ⇌ $CH_2=CHC_6H_4CH_2OC_6H_4CH_3$.

Examples of the above electrolyte-conferring functional group of the secondary component are: $ClCH_2COONa$, $BrCH_2COONa$, $ICH_2COONa$, $ClCH_2CH_2COONa$, $BrCH_2CH_2COONa$, $ICH_2CH_2COONa$, $ClCH_2CH_2CH_2COOK$, $BrCH_2CH_2CH_2COOK$, $ICH_2CH_2CH_2COOK$, $ClCH_2CH_2SO_3Na$, $BrCH_2CH_2SO_3Na$ $ICH_2CH_2SO_3Na$ $ClCH_2CH_2CH_2SO_3K$, $BrCH_2CH_2CH_2SO_3K$, $ICH_2CH_2CH_2SO_3Na$, $ClC_6H_4SO_3Na$ $ClC_6H_4N$ $ClCH_2C_6H_4SO_3Na$, $ClCH_2C_6H_4N$, $BrC_6H_4SO_3Na$, $BrC_6H_4N$, $BrCH_2C_6H_4SO_3$ K ⇌ $BrCH_2C_6H_4N$.

In the present invention, the above primary component containing a halogen group or a tosyl group along with a double bond is preferred to be used in the amount of about 1 to 50 mole % with reference to that of polyvinyl alcohol. If its content is less than 1 mol % there will be insufficient crosslinking. If its content exceeds 50 mole % it results in decrease in hydrophilicity.

In the present invention, the above secondary component containing a halogen group or a tosyl group along with an electrolyte-conferring functional group is preferred to be used in the amount of about 1 to 50 mole % with reference to that of polyvinyl alcohol. If its content is less than 1 mol % there will be insufficient electrolytic properties. If its content exceeds 50 mole % it cannot introduce a double bond and thus crosslinking cannot be formed.

As stated above, this invention also relates to a method of preparing crosslinked polyvinyl alcohol-based polymer membrane. The specific details are described herein below.

First, a polyvinyl alcohol-based polymer is dissolved in an organic solvent, and then added with a compound containing a base and a halogen or tosyl group along with a double bond and at the same time with a compound containing a halogen group or tosyl group and an electrolyte-conferring functional group and reacted for about 10 to about 24 minutes to prepare a mixed polymer solution.

Examples of the above base used to introduce a polymer double bond and an electrolyte-conferring functional group to a polyvinyl alcohol-based polymer via esterification are: Na, NaH, NaOH, KH, KOH, $Na_2CO_3$, $K_2CO_3$, $CH_3SOCH_2Na$.

The above base first forms a salt by reacting with a hydroxy group of the polyvinyl alcohol-based polymer and then facilitates easy substitutions of the compound containing a halogen or tosyl group along with a double bond and a compound containing a halogen and tosyl group along with a hydrophilic functional group into the targeted sites. The above base is preferable to use about 1.0 to about 1.2 moles with reference to the primary component containing a halogen or tosyl group along with a double bond or the secondary component containing a halogen or tosyl group along with an electrolyte-conferring functional group. If the molar ratio is below 1.0 its activity is not sufficient thus leaving a considerable amount of unreacted materials. If the molar ratio exceeds 1.2 the activity of the base is no longer increased thus resulting in the waste of the base.

Examples of the above organic solvent are dimethyl sulfoxide (DMSO), N-methyl-2-pyrolidone (NMP), dimethylformamide (DMF), hexafluoropropylene (HFP), dimethylacetamide (DMAC) and the like.

Then, thus prepared mixed polymer solution is filtered and the filtrate is precipitated and then dried to prepare a mixed polymer. The precipitation is performed by slowly adding a reacted polymer solution while stirring. The solvent should be able to easily dissolve unreacted materials while not dissolving polymer products and its examples are acetone, methylene chloride, ethyl acetate or a mixture thereof. Further, the solvent used in the precipitation is preferably used in the amount of about 1,000 to 3,000 wt % with reference to that of the filtrate. In addition, the precipitated mixed polymer is dried at about 70 to about 80° C. under vacuum for about 20 to 26 hours. Lastly, the above mixed polymer is dissolved in water to form a film and then cured by light or heat for about 10 minutes to about 24 hours.

The above mixed polymer is first mixed with a light initiator or a heat initiator in a predetermined ratio, coated on the porous support or a solid surface of glass plates, metals, polymers or ceramics to have a thin film, and then cured by irradiating with UV or electronic beams in the range of about 0.1 to 400 nm of wavelength or by heat-treatment at about 50 to 120° C. Applying light or heat on polymers induces an addition reaction between groups having double bonds and thus results in generation of water insoluble crosslinked polymers. The range of the wavelength of applying light source is important. For example, if the wavelength of the UV or electronic beam is below 0.1 nm the polymers become destroyed, whereas if the wavelength of the UV or electronic beam is above 400 nm crosslinking will not be formed. In case of crosslinking via heat treatment, if the temperature is below 50° C. it will slow the crosslinking process while if it is above 120° C. the polymers become destroyed.

Thus obtained polymer membranes become composed of ether groups as well as C—C bonds and C—H bonds which have strong chemical resistance. Therefore, they have improved mechanical properties such as durability as compared to that of the conventional crosslinked polyvinyl alcohol-based polymer electrolyte membranes containing ester, carbamate, acetal groups, etc., and thus they can be used as gas separation membrane, polymer electrolyte membrane, pervaporation membrane, reverse osmosis membrane, protein separation membrane or hydrophilic transparent membrane. Besides, these separation membranes can be also prepared as flat membranes, hollow fiber membranes, complex membranes or tube membranes via a known method. This invention is explained in more detail based on the following Examples, however, they should not be construed as limiting the scope of this invention.

EXAMPLES

Example 1

Eleven grams of PVA was added into a three-necked 500 mL flask equipped with a condenser and dissolved in 250 mL of anhydrous DMSO under the nitrogen atmosphere. After the above polymer was dissolved completely, NaH was slowly added thereto in the amount of 1.2 moles per 1 mole of allyl chloride and ClCH$_2$COONa to be added. Then, chloro acetic acid neutralized with allyl chloride and sodium hydroxide was added 5 moles (Example 1-a), 10 moles (Example 1-b), and 20 moles (Example 1-c), respectively, with reference to 1 mole of polyvinyl alcohol. After reaction of for about 16 hours, the mixture was filtered with an injection syringe filled with cotton or a filer paper and the filtrate was precipitated by slowly adding it to a 5 L of acetone. The precipitated polymer was dried at 80° C. under vacuum for a day and then analyzed with $^1$H-NMR. The result confirmed that an allyl group and an acetic acid group were added in a molar ratio.

$^1$H-NMR (d$_6$-DMSO, δ in ppm): δ5.8-6.0 (m, —CH=CH$_2$), δ5.0-5.3 (m, —CH=CH$_2$), δ4.2-4.7 (t, —OH), δ4.1-4.2 (s, —CH$_2$—COOH—), δ3.5-4.0 (br, —CH$_2$—CH), δ1.2-1.7 (br, —CH$_2$—CH).

In the above experiment, using other kinds of bases such as Na, NaOH, KH, KOH, Na$_2$CO$_3$, K$_2$CO$_3$, CH$_3$SOCH$_2$Na showed the same results. In addition, both the substitution of allyl chloride with allyl bromide, allyl iodide, allyl tosyl ether and the substitution of ClCH$_2$COONa with BrCH$_2$COONa, ICH$_2$COONa all showed the same results as in the above experiment.

A small amount of the above prepared three different kinds of polymers were dissolved in water (5 wt %) and formed films which were respectively cured by UV irradiation for about 30 minutes or heat treatment at 100° C. The crosslinked films were respectively placed in sufficient amount of water and performed a swelling test. The results showed that the swelling degree was 50% for Example 1-a, 130% for Example 1-b and 170% for Example 1-c, respectively, thus confirming that the above crosslinking reactions were performed successfully.

Further, when the above films were placed in an acidic condition of pH 2 for more than a month the films were not decomposed at all thus suggesting that the crosslinked polymer membrane has excellent chemical resistance.

Comparative Example 1

Eleven grams of PVA was added into a three-necked 500 mL flask equipped with a condenser and dissolved in 250 mL of anhydrous DMSO under the nitrogen atmosphere. After the above polymer was dissolved completely, 5 mole % of glutalaldehyde (Comparative Example 1-a), 10 mole % of fumaric acid (Comparative Example 1-b), and 20 mole % of toluene isocyanate (Comparative Example 1-c) were added thereto. Upon completion of the mixing, the mixture was added with an acid and thus prepared polymer was dried on the glass plate kept at 80° C. for a day. The crosslinked films were respectively placed in sufficient amount of water and performed a swelling test. The results showed that the swelling degree was 470% for Comparative Example 1-a, 313% for Comparative Example 1-b and 150% for Comparative Example 1-c respectively, thus confirming that the above crosslinking reactions were performed successfully. However, when the above films were placed in an acidic condition of pH 2 for a day the films were decomposed thus showing inappropriateness to use them as polymer membranes.

Experimental Example 1

The above three different polymer membranes prepared in Example 1 were cut into a predetermined size and used in the experiments for separation membranes. Permeation tests were performed on the mixed gases of CO$_2$/N$_2$ and O$_2$/N$_2$ according to the addition of an allyl group. The results are shown in the following table 1.

TABLE 1

| Separation Capability | Ex. 1-a | Ex. 1-b | Ex. 1-c |
|---|---|---|---|
| PCO$_2$[1](barrel) | 386.24 | 235.12 | 153.64 |
| PN$_2$(barrel) | 28.56 | 16.31 | 8.62 |
| αCO$_2$/N$_2$[2] | 13.53 | 14.42 | 17.82 |
| PO$_2$[3](barrel) | 89.53 | 68.51 | 42.24 |
| αO$_2$/N$_2$[4] | 3.8 | 4.2 | 4.9 |

[1]PCO$_2$: Permeation rate of CO$_2$
[2]αCO$_2$/N$_2$: Selectivity of CO$_2$ over N$_2$
[3]PO$_2$: Permeation rate of O$_2$
[4]αO$_2$/N$_2$: Selectivity of O$_2$ over N$_2$ A separation experiment for pervaporation was performed using the above separation membranes in a mixed solution comprising ethanol, trifluoroethyl alcohol, and acetic acid along with 1,000 ppm of water at 30° C. under $10^{-3}$ Torr and the results are shown in the following table 2.

TABLE 2

| Classification | Separation Capability | Ex. 1-a | Ex. 1-b | Ex. 1-c |
|---|---|---|---|---|
| Ethanol | Selectivity | 549 | 363 | 975 |
|  | Permeation Rate ($L/m^2hr$) | 0.438 | 0.316 | 0.113 |
| Trifluoroethyl alcohol | Selectivity | 449 | 176 | 751 |
|  | Permeation Rate ($L/m^2hr$) | 0.22 | 0.65 | 0.86 |
| Acetic acid | Selectivity | 830 | 927 | 489 |
|  | Permeation Rate ($L/m^2hr$) | 0.94 | 0.46 | 0.87 |
| Isopropyl alcohol | Selectivity | 621 | 135 | 117 |
|  | Permeation Rate ($L/m^2hr$) | 0.81 | 0.38 | 0.76 |

Experiments of reverse osmosis membrane, ultrafiltration membrane, and protein filtration were performed using the above separation membranes in an aqueous solution containing 1% of NaCl, $MgSO_4$, PEG 200, γ-globulin at 20° C. under 5 atm.

TABLE 3

| Classification | Separation Capability | Ex. 1-a | Ex. 1-b | Ex. 1-c |
|---|---|---|---|---|
| NaCl | Rejection (%) | 60 | 85 | 99 |
|  | Permeation Rate ($L/m^2hr$) | 0.1 | 0.3 | 0.2 |
| $MgSO_4$ | Rejection (%) | 90 | 95 | 99 |
|  | Permeation Rate ($L/m^2hr$) | 0.05 | 0.13 | 0.12 |
| PEG 200 | Rejection (%) | 95 | 97 | 99 |
|  | Permeation Rate ($L/m^2hr$) | 0.05 | 0.13 | 0.12 |
| γ-globulin | Rejection (%) | 99 | 99 | 99 |
|  | Permeation Rate ($L/m^2hr$) | 0.5 | 0.3 | 0.2 |

Anti-fogging test was performed using the above separation membranes by coating them on glass plates and under humidified condition. The results showed that permeation rate of visible lights were maintained at about 95% level and sufficient adhesiveness with the glass plates was maintained.

TABLE 4

| Classification | Ex. 1-a | Ex. 1-b | Ex. 1-c |
|---|---|---|---|
| Adhesive Strength | excellent | excellent | excellent |
| Permeation Rate of Light | 99 | 97 | 95 |

Functional capabilities of fuel cell membranes were performed using the above separation membranes. The results showed that the membranes maintained sufficient ion conductivity and mechanical strength as shown in the following table 5.

TABLE 5

| Classification | Ion Exchange Capacity (meq./g) | Moisture Content (%) | Membrane Surface Area Resistance ($\Omega \cdot cm^2$) | Tensile Strength ($kgf/cm^2$) |
|---|---|---|---|---|
| Ex. 1-a | 2.14 | 62 | 1.35 | 161 |
| Ex. 1-b | 2.61 | 65 | 1.53 | 174 |
| Ex. 1-c | 3.71 | 669 | 1.33 | 169 |

Example 2

Eleven grams of PVA was added into a three-necked 500 mL flask equipped with a condenser and dissolved in 250 mL of anhydrous DMSO under the nitrogen atmosphere. After the above polymer was dissolved completely, NaH was slowly added thereto in the amount of 1.2 moles per 1 mole of vinylbenzyl chloride and chloroethane sulfonic acid to be added. Then, chloro sulfonic acid neutralized with vinylbenzyl chloride and sodium hydride was added 5 moles (Example 2-a), 10 moles (Example 2-b), and 20 moles (Example 2-c), respectively, with reference to 1 mole of polyvinyl alcohol. After reaction of for about 16 hours, the mixture was filtered with an injection syringe filled with cotton or a filer paper and the filtrate was precipitated by slowly adding it to a 5 L of acetone. The precipitated polymer was dried at 80° C. under vacuum for a day and then analyzed with $^1$H-NMR. The result confirmed that vinylbenzyl group and ethane sulfonic acid group were added in a molar ratio. $^1$H-NMR ($d_6$-DMSO, δ in ppm): δ6.6-7.2 (br, Ar—H), δ4.2-4.7 (m, —OH, Ar—$CH_2$—Cl), δ3.5-4.0 (br, —$CH_2$—CH(OH)—, —$CH_2$—$CH_2$—SO3H), δ0.7-2.2 (br, backbone)

In the above experiment, using other kinds of bases such as Na, NaOH, KH, KOH, $Na_2CO_3$, $K_2CO_3$, $CH_3SOCH_2Na$ showed the same results. In addition, both the substitution of vinylbenzyl chloride with vinylbenzyl bromide, vinylbenzyl iodide, vinylbenzyl tosyl ether and the substitution of chloroethane sulfonic acid with bromosulfonic acid and iodosulfonic acid all showed the same results as in the above experiment.

A small amount of the above prepared three different kinds of polymers were dissolved in water (5 wt %) and formed films which were respectively cured by UV irradiation for about 30 minutes or heat treatment at 100° C. The crosslinked films were respectively placed in sufficient amount of water and performed a swelling test. The results showed that the swelling degree was 30% for Example 2-a, 80% for Example 2-b and 130% for Example 2-c, respectively, thus confirming that the above crosslinking reactions were performed successfully.

Further, when the above films were placed in an acidic condition of pH 2 for more than a month the films were not decomposed at all thus suggesting that the crosslinked polymer membrane has excellent chemical resistance.

Experimental Example 2

The above three different polymer membranes prepared in Example 2 were cut into a predetermined size and used in the experiments for separation membranes. Permeation tests were performed on the mixed gases of $CO_2/N_2$ and $O_2/N_2$ according to the addition of a vinylbenzyl group. The results are shown in the following table 6.

TABLE 6

| Separation Capability | Ex. 2-a | Ex. 2-b | Ex. 2-c |
|---|---|---|---|
| $PCO_2$[1](barrel) | 401.34 | 250.60 | 150.73 |
| $PN_2$(barrel) | 29.41 | 17.15 | 8.38 |
| $\alpha CO_2/N_2$[2] | 13.65 | 14.61 | 17.99 |
| $PO_2$[3](barrel) | 91.33 | 76.14 | 47.68 |
| $\alpha O_2/N_2$[4] | 3.1 | 4.4 | 5.7 |

[1]$PCO_2$: Permeation rate of $CO_2$
[2]$\alpha CO_2/N_2$: Selectivity of $CO_2$ over $N_2$
[3]$PO_2$: Permeation rate of $O_2$
[4]$\alpha O_2/N_2$: Selectivity of $O_2$ over $N_2$ A separation experiment for pervaporation was performed using the above separation membranes in a mixed solution comprising ethanol, trifluoroethyl alcohol, and acetic acid along with 1,000 ppm of water at 30° C. under $10^{-3}$ Torr and the results are shown in the following table 7.

TABLE 7

| Classification | Separation Capability | Ex. 2-a | Ex. 2-b | Ex. 2-c |
|---|---|---|---|---|
| Ethanol | Selectivity | 426 | 630 | 920 |
|  | Permeation Rate (L/m²hr) | 0.537 | 0.321 | 0.121 |
| Trifluoroethyl alcohol | Selectivity | 432 | 186 | 712 |
|  | Permeation Rate (L/m²hr) | 0.32 | 0.79 | 0.98 |
| Acetic acid | Selectivity | 823 | 905 | 488 |
|  | Permeation Rate (L/m²hr) | 0.84 | 0.39 | 0.79 |
| Isopropyl alcohol | Selectivity | 756 | 147 | 121 |
|  | Permeation Rate (L/m²hr) | 0.71 | 0.30 | 0.63 |

Experiments of reverse osmosis membrane, ultrafiltration membrane, and protein filtration were performed using the above separation membranes in an aqueous solution containing 1% of NaCl, $MgSO_4$, PEG 200, γ-globulin at 20° C. under 5 atm.

TABLE 8

| Classification | Separation Capability | Ex. 2-a | Ex. 2-b | Ex. 2-c |
|---|---|---|---|---|
| NaCl | Rejection (%) | 56 | 78 | 90 |
|  | Permeation Rate (L/m²hr) | 0.1 | 0.2 | 0.3 |
| $MgSO_4$ | Rejection (%) | 80 | 84 | 87 |
|  | Permeation Rate (L/m²hr) | 0.06 | 0.15 | 0.16 |
| PEG 200 | Rejection (%) | 102 | 98 | 99 |
|  | Permeation Rate (L/m²hr) | 0.04 | 0.13 | 0.10 |
| γ-globulin | Rejection (%) | 95 | 99 | 100 |
|  | Permeation Rate (L/m²hr) | 0.6 | 0.4 | 0.2 |

Anti-fogging test was performed using the above separation membranes by coating them on glass plates and under humidified condition. The results showed that permeation rate of visible lights were maintained at about 95% level and sufficient adhesiveness with the glass plates was maintained.

TABLE 9

| Classification | Ex. 2-a | Ex. 2-b | Ex. 2-c |
|---|---|---|---|
| Adhesive Strength | excellent | excellent | excellent |
| Transmittance of Light | 99 | 98 | 95 |

Functional capabilities of fuel cell membranes were performed using the above separation membranes. The results showed that the membranes maintained sufficient ion conductivity and mechanical strength as shown in the following table 5.

TABLE 10

| Classification | Ion Exchange Capacity (meq./g) | Moisture Content (%) | Membrane Surface Area Resistance (Ω·cm²) | Tensile Strength (kgf/cm²) |
|---|---|---|---|---|
| Ex. 2-a | 2.14 | 64 | 1.35 | 166 |
| Ex. 2-b | 2.16 | 68 | 1.54 | 176 |
| Ex. 2-c | 3.37 | 68 | 1.31 | 166 |

Example 3

Eleven grams of polyethylenevinyl alcohol (PEVA) was added into a three-necked 500 mL flask equipped with a condenser and dissolved in 250 mL of anhydrous DMSO under the nitrogen atmosphere. After the above polymer was dissolved completely, NaH was slowly added thereto in the amount of 1.2 moles per 1 mole of allyl chloride and $ClCH_2COONa$ to be added. Then, allyl chloride and $ClCH_2COONa$ were respectively added 5 moles (Example 3-a), 10 moles (Example 3-b), and 20 moles (Example 3-c), respectively, with reference to 1 mole of polyvinyl alcohol. After reaction of for about 16 hours, the mixture was filtered with an injection syringe filled with cotton or a filer paper and the filtrate was precipitated by slowly adding it to a 5 L of acetone. The precipitated polymer was dried at 80° C. under vacuum for a day and then analyzed with $^1$H-NMR. The result confirmed that an allyl group was added in a molar ratio.

$^1$H-NMR ($d_6$-DMSO, δ in ppm): δ5.8-6.0 (m, —CH=$CH_2$), δ5.0-5.3 (m, —CH=$CH_2$), δ4.2-4.7 (t, —OH), δ3.5-4.0 (br, —$CH_2$—CH—), δ0.7-2.2 (br, backbone).

In the above experiment, using other kinds of bases such as Na, NaOH, KH, KOH, $Na_2CO_3$, $K_2CO_3$, $CH_3SOCH_2Na$ showed the same results. In addition, the substitution of allyl chloride with allyl bromide, allyl iodide, allyl tosyl ether showed the same results as in the above experiment.

A small amount of the above prepared three different kinds of polymers were dissolved in water (5 wt %) and formed films which were respectively cured by UV irradiation for about 30 minutes or heat treatment at 100° C. The crosslinked films were respectively placed in sufficient amount of water and performed a swelling test. The results showed that the swelling degree was 30% for Example 3-a, 70% for Example 3-b and 120% for Example 3-c, respectively, thus confirming that the above crosslinking reactions were performed successfully.

Further, when the above films were placed in an acidic condition of pH 2 for more than a month the films were not decomposed at all thus suggesting that the crosslinked polymer membrane has excellent chemical resistance.

Experimental Example 3

The above three different polymer membranes prepared in Example 3 were cut into a predetermined size and used in the experiments for separation membranes. Permeation tests were performed on the mixed gases of $CO_2/N_2$ and $O_2/N_2$ according to the addition of an allyl group. The results are shown in the following table 11.

TABLE 11

| Separation Capability | Ex. 3-a | Ex. 3-b | Ex. 3-c |
|---|---|---|---|
| $PCO_2$[1](barrel) | 351.06 | 220.65 | 110.15 |
| $PN_2$(barrel) | 20.70 | 12.43 | 5.92 |
| $\alpha CO_2/N_2$[2] | 16.96 | 17.75 | 18.61 |
| $PO_2$[3](barrel) | 80.41 | 61.44 | 33.49 |
| $\alpha O_2/N_2$[4] | 3.9 | 4.9 | 5.7 |

[1] $PCO_2$: Permeation rate of $CO_2$
[2] $\alpha CO_2/N_2$: Selectivity of $CO_2$ over $N_2$
[3] $PO_2$: Permeation rate of $O_2$
[4] $\alpha O_2/N_2$: Selectivity of $O_2$ over $N_2$ A separation experiment for pervaporation was performed using the above separation membranes in a mixed solution comprising ethanol, trifluoroethyl alcohol, and acetic acid along with 1,000 ppm of water at 30° C. under $10^{-3}$ Torr and the results are shown in the following table 2.

TABLE 12

| Classification | Separation Capability | Ex. 3-a | Ex. 3-b | Ex. 3-c |
|---|---|---|---|---|
| Ethanol | Selectivity | 336 | 518 | 760 |
| | Permeation Rate (L/m²hr) | 0.403 | 0.291 | 0.107 |
| Trifluoroethyl alcohol | Selectivity | 323 | 157 | 642 |
| | Permeation Rate (L/m²hr) | 0.26 | 0.68 | 0.78 |
| Acetic acid | Selectivity | 623 | 714 | 312 |
| | Permeation Rate (L/m²hr) | 0.72 | 0.30 | 0.68 |
| Isopropyl alcohol | Selectivity | 635 | 134 | 110 |
| | Permeation Rate (L/m²hr) | 0.67 | 0.23 | 0.53 |

Experiments of reverse osmosis membrane, ultrafiltration membrane, and protein filtration were performed using the above separation membranes in an aqueous solution containing 1% of NaCl, $MgSO_4$, PEG 200, γ-globulin at 20° C. under 5 atm.

TABLE 13

| Classification | Separation Capability | Ex. 3-a | Ex. 3-b | Ex. 3-c |
|---|---|---|---|---|
| NaCl | Rejection (%) | 45 | 70 | 82 |
| | Permeation Rate (L/m²hr) | 0.07 | 0.15 | 0.24 |
| $MgSO_4$ | Rejection (%) | 72 | 79 | 84 |
| | Permeation Rate (L/m²hr) | 0.04 | 0.09 | 0.12 |
| PEG 200 | Rejection (%) | 95 | 82 | 87 |
| | Permeation Rate (L/m²hr) | 0.03 | 0.10 | 0.07 |
| γ-globulin | Rejection (%) | 96 | 98 | 99 |
| | Permeation Rate (L/m²hr) | 0.5 | 0.3 | 0.2 |

Anti-fogging test was performed using the above separation membranes by coating them on glass plates and under humidified condition. The results showed that permeation rate of visible lights were maintained at about 95% level and sufficient adhesiveness with the glass plates was maintained.

TABLE 14

| Classification | Ex. 3-a | Ex. 3-b | Ex. 3-c |
|---|---|---|---|
| Adhesive Strength | excellent | excellent | excellent |
| Transmittance of Light | 95 | 96 | 97 |

Functional capabilities of fuel cell membranes were performed using the above separation membranes. The results showed that the membranes maintained sufficient ion conductivity and mechanical strength as shown in the following table 15.

TABLE 15

| Classification | Ion Exchange Capacity (meq./g) | Moisture Content (%) | Membrane Surface Area Resistance ($\Omega \cdot cm^2$) | Tensile Strength (kgf/cm²) |
|---|---|---|---|---|
| Ex. 3-a | 2.14 | 64 | 1.35 | 166 |
| Ex. 3-b | 2.16 | 68 | 1.54 | 176 |
| Ex. 3-c | 3.37 | 68 | 1.31 | 166 |

Example 4

Eleven grams of polyethylenevinyl alcohol (PEVA) was added into a three-necked 500 mL flask equipped with a condenser and dissolved in 250 mL of anhydrous DMSO under the nitrogen atmosphere. After the above polymer was dissolved completely, NaH was slowly added thereto in the amount of 1.2 moles per 1 mole of benzyl chloride to be added. Then, benzyl chloride and chlorobenzene sulfonate were respectively added 5 moles (Example 4-a), 10 moles (Example 4-b), and 20 moles (Example 4-c), respectively, with reference to 1 mole of polyvinyl alcohol. After reaction of for about 16 hours, the mixture was filtered with an injection syringe filled with cotton or a filer paper and the filtrate was precipitated by slowly adding it to a 5 L of acetone. The precipitated polymer was dried at 80° C. under vacuum for a day and then analyzed with $^1$H-NMR. The result confirmed that vinylbenzyl group and benzene sulfonate group were added in a molar ratio.

$^1$H-NMR ($d_6$-DMSO, δin ppm): δ6.6-7.2 (br, Ar—H), δ4.2-4.7 (m, —OH, Ar—$CH_2$—Cl), δ3.5-4.0 (br, —$CH_2$—CH(OH)—), δ0.7-2.2 (br, backbone)

In the above experiment, using other kinds of bases such as Na, NaOH, KH, KOH, $Na_2CO_3$, $K_2CO_3$, $CH_3SOCH_2Na$ showed the same results. In addition, the substitution of vinylbenzyl chloride with vinylbenzyl bromide, vinylbenzyl iodide, vinylbenzyl tosyl ether showed the same results as in the above experiment.

A small amount of the above prepared three different kinds of polymers were dissolved in water (5 wt %) and formed films which were respectively cured by UV irradiation for about 30 minutes. The crosslinked films were respectively placed in sufficient amount of water and performed a swelling test. The results showed that the swelling degree was 40% for Example 4-a, 65% for Example 4-b and 110% for Example 4-c, respectively, thus confirming that the above crosslinking reactions were performed successfully.

Further, when the above films were placed in an acidic condition of pH 2 for more than a month the films were not decomposed at all thus suggesting that the crosslinked polymer membrane has excellent chemical resistance.

Comparative Example 2

When the GFT membrane (Schultz Chemtech, Germany) was placed in an acidic condition of pH 2 for more than a day the film on the top portion of the complex membrane was decomposed thus suggesting that the above membrane is not suitable for use as a polymer membrane.

Experimental Example 4

The above three different polymer membranes prepared in Example 4 were cut into a predetermined size and used in the experiments for separation membranes. Permeation tests were performed on the mixed gases of $CO_2/N_2$ and $O_2/N_2$ according to the addition of a vinylbenzyl group and a benzenesulfonate group. The results are shown in the following table 16.

TABLE 16

| Separation Capability | Ex. 4-a | Ex. 4-b | Ex. 4-c |
|---|---|---|---|
| $PCO_2^{1)}$(barrel) | 390.35 | 240.06 | 122.38 |
| $PN_2$(barrel) | 22.05 | 11.63 | 6.12 |
| $\alpha CO_2/N_2^{2)}$ | 17.70 | 20.64 | 20.00 |
| $PO_2^{3)}$(barrel) | 85.25 | 66.37 | 39.20 |
| $\alpha O_2/N_2^{4)}$ | 3.9 | 5.7 | 6.4 |

$^{1)}PCO_2$: Permeation rate of $CO_2$
$^{2)}\alpha CO_2/N_2$: Selectivity of $CO_2$ over $N_2$
$^{3)}PO_2$: Permeation rate of $O_2$
$^{4)}\alpha O_2/N_2$: Selectivity of $O_2$ over $N_2$ A separation experiment for pervaporation was performed using the above separation membranes in a mixed solution comprising ethanol, trifluoroethyl alcohol, and acetic acid along with 1,000 ppm of water at 30° C. under $10^{-3}$ Torr and the results are shown in the following table 2.

TABLE 17

| Classification | Separation Capability | Ex. 4-a | Ex. 4-b | Ex. 4-c |
|---|---|---|---|---|
| Ethanol | Selectivity | 360 | 571 | 854 |
|  | Permeation Rate (L/m²hr) | 0.443 | 0.335 | 0.124 |
| Trifluoroethyl alcohol | Selectivity | 333 | 168 | 654 |
|  | Permeation Rate (L/m²hr) | 0.32 | 0.73 | 0.83 |
| Acetic acid | Selectivity | 632 | 754 | 362 |
|  | Permeation Rate (L/m²hr) | 0.78 | 0.35 | 0.69 |
| Isopropyl alcohol | Selectivity | 645 | 147 | 134 |
|  | Permeation Rate (L/m²hr) | 0.71 | 0.47 | 0.63 |

Experiments of reverse osmosis membrane, ultrafiltration membrane, and protein filtration were performed using the above separation membranes in an aqueous solution containing 1% of NaCl, $MgSO_4$, PEG 200, γ-globulin at 20° C. under 5 atm.

TABLE 18

| Classification | Separation Capability | Ex. 4-a | Ex. 4-b | Ex. 4-c |
|---|---|---|---|---|
| NaCl | Rejection (%) | 65 | 75 | 98 |
|  | Permeation Rate (L/m²hr) | 0.09 | 0.25 | 0.34 |

TABLE 18-continued

| Classification | Separation Capability | Ex. 4-a | Ex. 4-b | Ex. 4-c |
|---|---|---|---|---|
| $MgSO_4$ | Rejection (%) | 78 | 82 | 89 |
|  | Permeation Rate (L/m²hr) | 0.09 | 0.12 | 0.15 |
| PEG 200 | Rejection (%) | 97 | 88 | 95 |
|  | Permeation Rate (L/m²hr) | 0.06 | 0.12 | 0.10 |
| γ-globulin | Rejection (%) | 97 | 99 | 99 |
|  | Permeation Rate (L/m²hr) | 0.5 | 0.4 | 0.3 |

Anti-fogging test was performed using the above separation membranes by coating them on glass plates and under humidified condition. The results showed that permeation rate of visible lights were maintained at about 95% level and sufficient adhesiveness with the glass plates was maintained.

TABLE 19

| Classification | Ex. 3-a | Ex. 3-b | Ex. 3-c |
|---|---|---|---|
| Adhesive Strength | excellent | excellent | excellent |
| Transmittance of Light(%) | 96 | 98 | 98 |

Functional capabilities of fuel cell membranes were performed using the above separation membranes. The results showed that the membranes maintained sufficient ion conductivity and mechanical strength as shown in the following table 15.

TABLE 20

| Classification | Ion Exchange Capacity (meq./g) | Moisture Content (%) | Membrane Surface Area Resistance ($\Omega \cdot cm^2$) | Tensile Strength (kgf/cm²) |
|---|---|---|---|---|
| Ex. 4-a | 2.4 | 64 | 1.5 | 160 |
| Ex. 4-b | 2.6 | 65 | 1.5 | 174 |
| Ex. 4-c | 3.7 | 66 | 1.3 | 162 |

The invention has been described in detail with reference to preferred embodiments thereof. However, it will be appreciated that those skilled in the art, upon consideration of the disclosure, may make modifications and improvements within the scope and spirit of the invention.

What is claimed is:

1. A polymer membrane consisting of polyvinyl alcohol-based polymers crosslinked by applying light or heat on a polymer of formula 1,

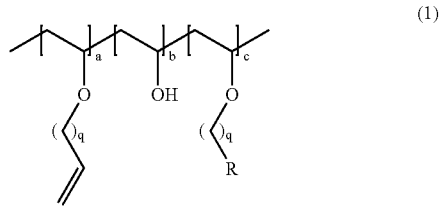

(1)

wherein q is an integer of 1 to 3; and
R is a functional group having an electrolytic property selected from the group consisting of carboxylic acid, sulfonic acid, and ethylene oxide; and the sum of a, b, and c is in the range of 100 ≦a+b+c≦100,000.

2. The polymer membrane of claim 1, wherein said polymer membrane is prepared in the form of a flat membrane, a hollow fiber membrane, a complex membrane or a tube membrane.

3. The polymer membrane of claim 1, wherein said polymer membrane is prepared in the form of a gas separation membrane, an electrolyte membrane, a reverse osmosis membrane, a protein separation membrane or a hydrophilic transparent coating membrane.

4. A method for preparing a polymer membrane comprising:
(a) preparing a crosslinkable polymer of formula 1 by reacting the polyvinyl alcohol-based polymer of formula 2 with the compounds of formulas 3 and 4;
(b) preparing a crosslinked polyvinyl alcohol-based polymer membrane by coating said crosslinkable polymer of formula 1 on a base plate followed by light irradiation or heat treatment, and

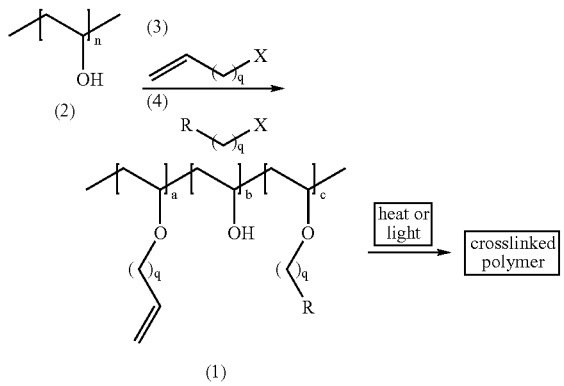

wherein q is an integer of 1 to 3;
R is a functional group having an electrolytic property selected from the group consisting of carboxylic acid, sulfonic acid, and ethylene oxide, and
the sum of a, b, and c is in the range of 100≦a+b+c≦100,000 and n is in the range of 100≦n≦100,000; and
X is a leaving group selected from the group consisting of a halogen atom, toluene sulfonate, and benzylhalide.

5. The method of claim 4, wherein the compound of said formula 2 is selected from the group consisting of polyvinyl alcohol, polyvinyl acetate-vinyl alcohol copolymer, polyethylene-vinyl alcohol copolymer, polyvinyl alcohol(metha)acryl copolymer, polyvinyl alcohol-vinyl chloride copolymer and polyvinyl alcohol-styrene copolymer.

6. The method of claim 4, wherein the compound of said formula 3 is selected from the group consisting of bromopentene, chloropentene, iodopentene, tosyloxypentene, bromoethylene, chloroethylene, iodoethylene, vinyltosylether, bromobutene, chlorobutene, iodobutene, tosyloxybutene, vinylbenzylbroxnide, vinylbenzylchloride, vinylbenzyliodide, vinylbenzyltosylether, allylchloride, allylbromide and allytosylether.

7. The method of claim 4, wherein the compound of said formula 4 is selected from the group consisting of ClCH$_2$COONa, BrCH$_2$COONa, ICH$_2$COONa, ClCH$_2$CH$_2$COONa, BrCH$_2$CH$_2$COONa, ICH$_2$CH$_2$COONa, ClCH$_2$CH$_2$CH$_2$COOK, BrCH$_2$CH$_2$CH$_2$COOK, ICH$_2$CH$_2$CH$_2$COOK, ClCH$_2$CH$_2$SO$_3$Na, BrCH$_2$CH$_2$SO$_3$Na, ICH$_2$CH$_2$SO$_3$Na, ClCH$_2$CH$_2$CH$_2$SO$_3$K, BrCH$_2$CH$_2$CH$_2$SO$_3$K, ICH$_2$CH$_2$CH$_2$SO$_3$Na, ClC$_6$H$_4$SO$_3$Na, ClC$_6$H$_4$N, ClCH$_2$C$_6$H$_4$SO$_3$Na, ClCH$_2$C$_6$H$_4$N, BrC$_6$H$_4$SO$_3$Na, BrC$_6$H$_4$N, BrCH$_2$C$_6$H$_4$SO$_3$K and BrCH$_2$C$_6$H$_4$N.

8. The method of claim 4, wherein the polymer of said formula 1 is prepared by reacting at least one base selected from the group consisting of Na, NaOH, KH, KOH, Na$_2$CO$_3$, K$_2$CO$_3$ and CH$_3$SOCH$_2$Na in the range of about 1.0 to about 1.2 molar ratio with reference to the compounds of said formulas 3 and 4.

9. The method of claim 4, wherein said light has a wavelength in the range of about 0.1 to about 400 nm and said temperature for heat treatment is in the range of about 50° C. to 120° C.

* * * * *

UNITED STATES PATENT AND TRADEMARK OFFICE
CERTIFICATE OF CORRECTION

PATENT NO. : 7,449,112 B2 Page 1 of 1
APPLICATION NO. : 11/091896
DATED : November 11, 2008
INVENTOR(S) : Lee et al.

It is certified that error appears in the above-identified patent and that said Letters Patent is hereby corrected as shown below:

On the title page, item (57), line 8, "process its" should read --process of its--.

In claim 1, column 15, lines 1-2, "100 $\leq a+b+c+ \leq 100,000$." should read --100 $\leq a+b+c \leq 100,000$.--.

In claim 6, column 16, line 16, "vinylbenzylbroxnide," should read --vinylbenzylbromide,--.

In claim 7, column 16, line 27, "ClC$_6$H$_4$SO$_3$Na, ClC$_6$H$_4$N," should read --ClC$_6$H$_4$SO$_3$Na, ClC$_6$H$_4$N,--.

Signed and Sealed this

Tenth Day of February, 2009

JOHN DOLL
*Acting Director of the United States Patent and Trademark Office*